Mar. 3, 1925.

W. A. LAYCOCK ET AL

CIRCUIT MAKER AND BREAKER

Filed May 2, 1923

W. A. LAYCOCK
J. C. FARRAR
H. H. WOLBERT

Inventor

By Watson E. Coleman

Attorney

Mar. 3, 1925.  
W. A. LAYCOCK ET AL  
1,528,118  
CIRCUIT MAKER AND BREAKER  
Filed May 2, 1923  2 Sheets-Sheet 2
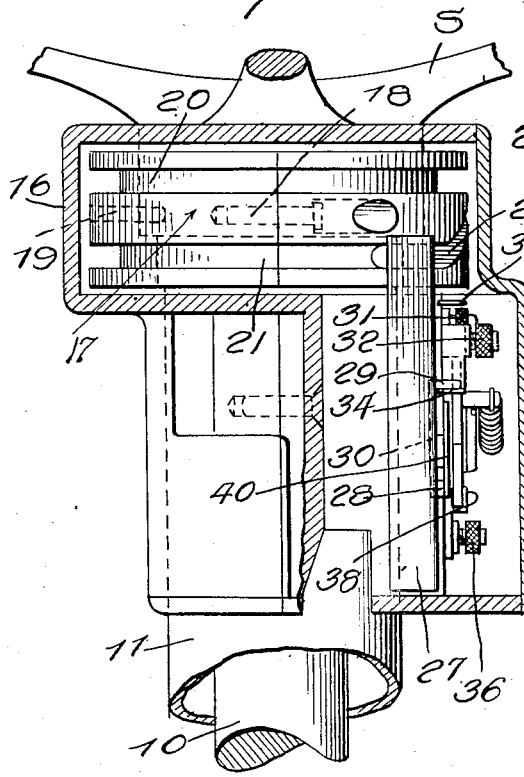
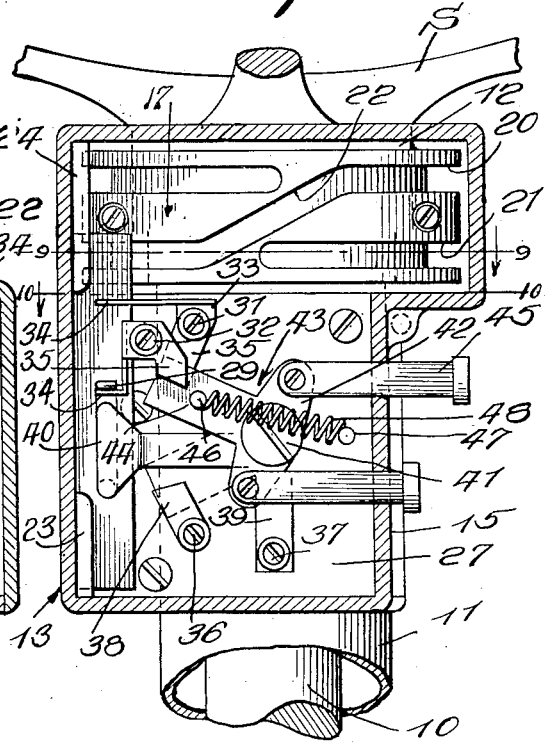
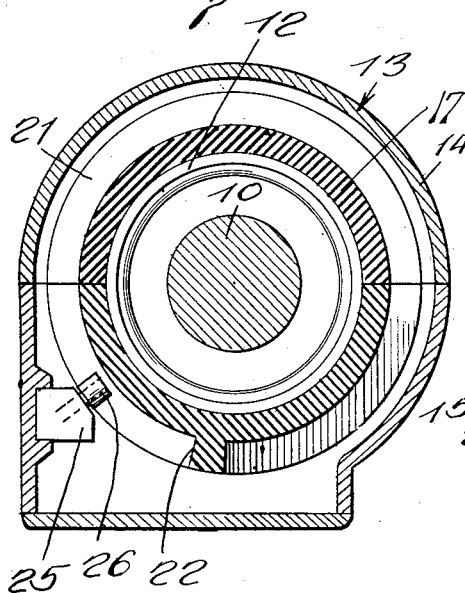
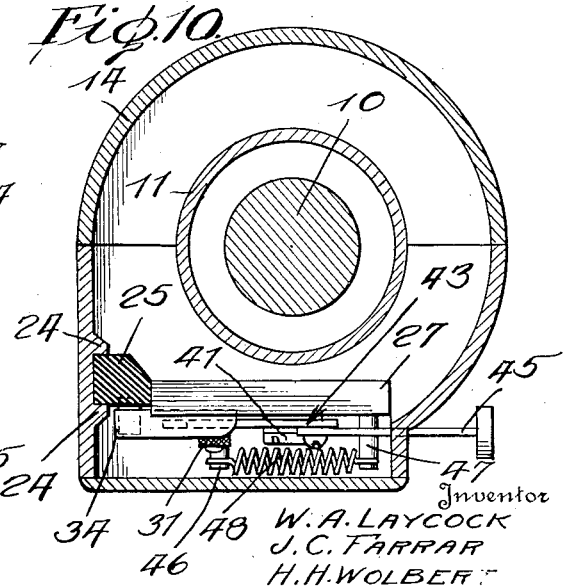

Patented Mar. 3, 1925.

1,528,118

UNITED STATES PATENT OFFICE.

WILBUR A. LAYCOCK, JOHN C. FARRAR, AND HARRY H. WOLBERT, OF DELTA, COLORADO.

CIRCUIT MAKER AND BREAKER.

Application filed May 2, 1923. Serial No. 636,207.

*To all whom it may concern:*

Be it known that we, WILBUR A. LAYCOCK, JOHN C. FARRAR, and HARRY H. WOLBERT, citizens of the United States, residing at Delta, in the county of Delta and State of Colorado, have invented certain new and useful Improvements in Circuit Makers and Breakers, of which the following is a specification, reference being had to the accompanying drawings.

This invention relates to circuit makers and breakers, and more particularly to devices of this character for controlling the lighting systems of automobiles.

An important object of this invention is to provide a switch for accomplishing control of the road illumination means of a vehicle which embodies a pair of ordinary headlights and a pair of curve lights such as described in our co-pending application for road illumination control for vehicles, filed January 6, 1923, Serial No. 611,055.

In the above identified application we have described a control system for controlling the headlights of an automobile and for controlling a pair of curve lights or lights which direct rays to the side of the road upon which the vehicle is traveling. As set forth in this application, the control means is necessarily partially manual and partially automatic, and an important object of this invention is to provide a combined switch structure which is readily adjustable to the steering post of a vehicle so that it may be accessible to the driver of the vehicle and which embodies both an automatic and a manual control for such curve lights.

A further object of the invention is to provide in a compound switch of this character a novel and improved operating mechanism for the automatic section of the switch, so constructed as to permit substantially a complete revolution of the steering wheel in either direction from a given position without disengagement of the parts of the switch and without damage to the parts thereof.

A still further object of the invention is to provide a switch of this character in which the number of parts is reduced to a minimum and in which the parts of the manual and automatic switch have interlocking engagement with one another, serving to maintain these parts in assembled relation.

These and other objects we attain by the construction shown in the accompanying drawings, wherein for the purpose of illustration is shown a preferred embodiment of our invention and wherein:—

Figure 3 is a wiring diagram showing the wiring system employed;

Figure 7 is a detailed view partially in section showing the general assembly of the switch;

Figure 8 is a similar view taken at right-angles to the view shown in Figure 7; and Figures 9 and 10 are sections on the lines 9—9 and 10—10 of Figure 8.

Figure 1:
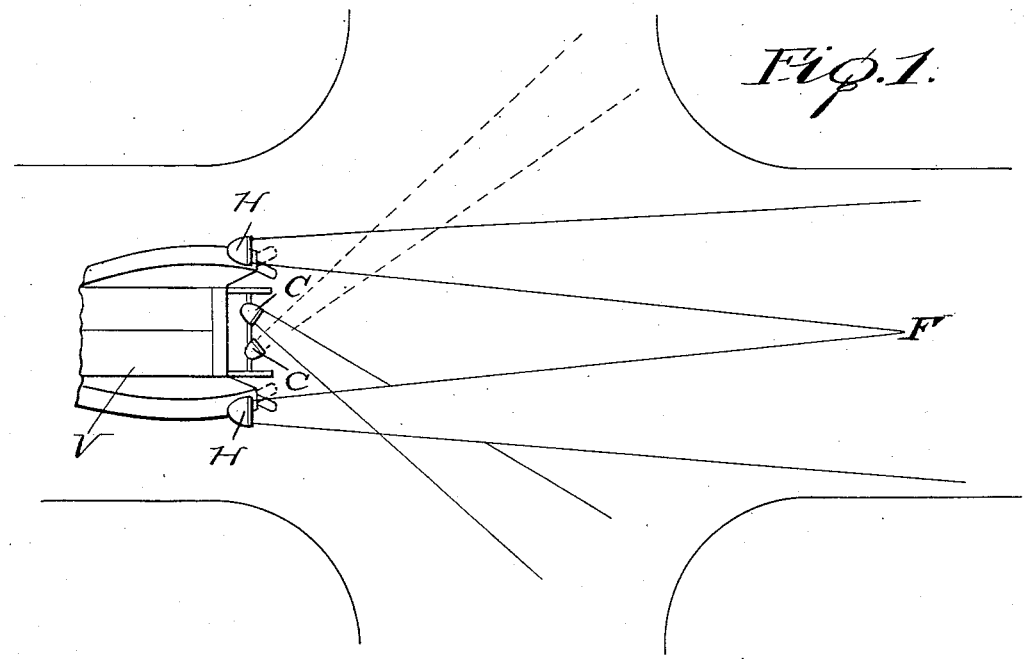
Figure 1 is a plan view partially diagrammatic showing a vehicle equipped with lights constructed in accordance with our invention and illustrating the control of the lights possible by the switch.
Figure 2:
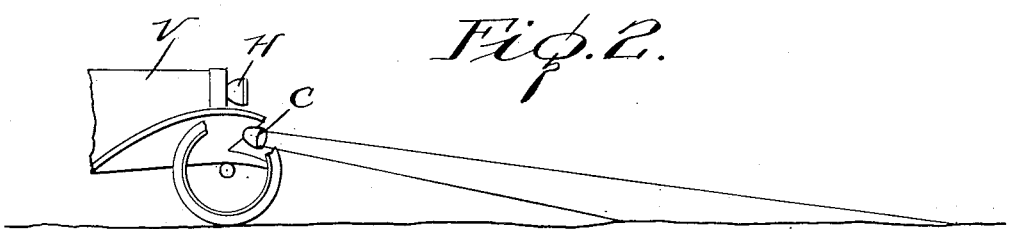
Figure 2 is a side elevation showing the angle of the curve lights.
Figure 4:
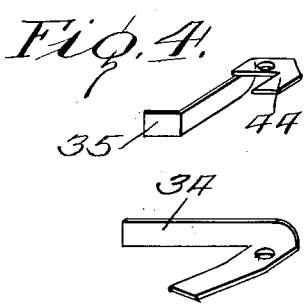
Figures 4 and 5 are perspective views of the contact members employed.
Figure 5:
Figure 6:
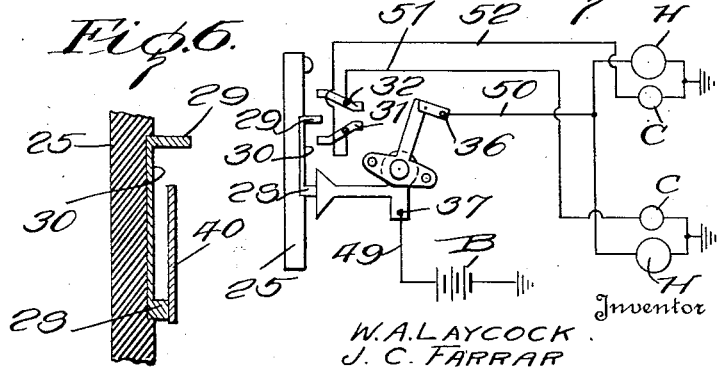
Figure 6 is a detailed sectional view of the movable member of the automatic switch.

Referring now more particularly to the drawings, V designates a vehicle having the usual headlights H and provided in addition to such headlights with curve lights C. The curve lights C are arranged at the sides of the vehicle at the front thereof so as to direct the rays thereof downwardly upon the road, as indicated in Figure 2. It will be noted that the rays passing from these lights as indicated in this figure all remain below a plane passing through the upper portion of the light and paralleling the road upon which the vehicle is traveling. The headlights H will focus upon the road at a point approximately indicated by the character F and in the usual manner.

The steering post of the vehicle is represented at 10 and the steering post housing at 11 and the hub of the steering wheel S at 12. In the construction of the switch we provide a housing 13 formed of two separable sections 14 and 15, which when secured together clamp firmly upon the steering post housing 11 and form about the hub 12 of the steering wheel an annular casing 16. Within this casing upon the hub 12 we secure an annulus 17 composed of a pair of separable sections secured together as at 18, the annulus being held against rotation with relation to the steering post by a dowel pin 19 extending therethrough and engaging in the hub 12 of the steering wheel. This annulus has formed in its outer surface a pair of transversely spaced circumferentially disposed grooves 20 and 21, each of these grooves being continuous throughout approximately 340°, the opposite ends of the grooves being connected by an inclined branch groove 22 angling across the peripheral face of the annulus.

The section 15 has formed therein a compartment, upon one wall of which is formed a pair of spaced ribs 23 and a similar pair of ribs are formed upon the wall of the annular casing 16 as indicated at 24. These ribs form guides for an elongated insulating block 25, one end of which is provided with a roller 26 entering one of the grooves of the annulus 17. The section 15 likewise affords supports for a plate 27 formed of insulating material the edge of which abuts the outer face of the block 25 and prevents disengagement thereof from the ribs 23 and 24. The block 25 embodies a pair of longitudinally spaced contact members 28 and 29, these contact members being electrically connected as at 30.

It will be obvious that upon rotation of the steering wheel S the engagement of the roller 26 of the block 25 in the grooves 20, 21 and 22 of the annulus will cause the block 25 to be reciprocated through a distance equal to the space between the center lines of grooves 20 and 21. It will be understood that normally when the wheels of the vehicle are directed straight ahead this roller will be engaged in the inclined slot 22 connecting the slots 20 and 21 and so will be positioned at an intermediate point. If the steering wheel is rotated in one direction the block 25 will be shifted endwise toward the steering wheel and will finally engage in the slot 20. If it is rotated in the opposite direction the roller 26 will move the block 25 away from the steering wheel and it will finally engage in the slot 21. This movement of the block 25 is employed, as will hereinafter more fully appear, to control the automatic lighting of the curve lights C above referred to.

Mounted upon the plate 27 are a pair of adjacent binding posts 31 and 32, these binding posts being arranged at that side of the plate 27 next adjacent the block 25. Each of these binding posts forms a mounting for and is electrically connected with a strip of metal 33, formed to provide at one side of the binding post a resilient tongue 34 overlying the block 25 and in the path of the contact 29 thereof and at the opposite side of the binding post a resilient contact 35. The spring contacts 34 are spaced apart a distance slightly less than the travel of the contact 29 of the block 25 and extend transversely of the block. The contacts 35 are positioned above the block 27 in superimposed relation, being spaced from one another for a purpose presently appear. Mounted at the opposite end of the plate 27 is a further pair of spaced binding posts 36 and 37. The binding post 36 has mounted thereon a resilient contact member 38 extending toward the contacts 35 of the binding posts 31 and 32. Electrically connected to the binding posts 37 is the end of one arm 39 of a substantially L shaped strip of conducting material, the other arm of which is provided with a broadened end portion 40 overlying the contact 28 of the block 25 and resiliently engaging therewith to establish at all times during reciprocation of the block 25 an electrical connection between the binding post 37 and the contact 28. It follows that the contact 29 of the block is at all times electrically connected with the binding post 37.

Mounted in the plate 27 is a pivot 41 extending through and electrically connected to the conducting plate 39 at the juncture of the arms thereof. Upon this pivot is mounted centrally the head portion 42 of a T shaped member 43 formed of conducting material. The stem portion 44 of this T shaped member forms a blade swingable by means of push buttons 45 extended through the wall of the casing, to engage either the contact 38 or to simultaneously engage between the contacts 35 and thus to electrically connect the binding posts 36 and 37 or the binding post 37 and the binding posts 31 and 32. Secured at one end to a lug 46, mounted upon the stem 44, is a spring 48 the opposite end of which is connected with a post 47 carried by the plate 27 and so arranged that a line connecting it with the center of the pivot 41 passes intermediate the contact 38 and the contacts 35. It will be obvious that upon movement of the T shaped plate 43, under the influence of one of the push buttons 45, from an engagement with the contact 38 or the contacts 35 to a point past such line, will bring into action the spring 48 to shift the plate the remaining distance for engagement with the other of the contacts.

In employing the above structure, if the binding post 37 be connected by a wire 49 with one terminal of a battery or other source of current, the opposite terminal of which is grounded, the binding post 36 is connected with lights H through wire 50 and the binding posts 31 and 32 by wires 52 and 51 with their respective curve lights C. Then during normal operation of the vehicle, the contact 29 being spaced between its coacting contacts 34, the curve lights C will not be energized and the headlights H will be energized, it being understood that during normal operation or under ordinary road conditions the blade 44 is in engagement with the contact 38. Accordingly, during such normal operation current flows from the source B through wire 49, binding post 37, conductor plate 39, switch plate 43, contact 38, binding post 36 and wire 50 to the headlights. If another machine is met upon the road, a push button 45 is engaged to shift the blade 44 of the manually operated switch, so that it engages between the contacts 35 of the binding posts 31 and 32. By this action the headlights are disconnected and the curve lights C energized, current now flowing from the source B through wire 49, binding post 37, plate 39, plate 43, contacts 35, binding posts 31 and 32 and wires 52 and 51 to the curve lights and from these curve lights through the ground to the source B. By this operation in passing the other machine perfect lighting of the road is accomplished, light being provided which is sufficiently strong to fully illuminate the road and which is directed downwardly and toward the sides of the road, thus illuminating not only the path of the vehicle upon which the lights are provided but likewise the path of the passing vehicle. The vehicle having passed, the other of the push buttons 45 is engaged, returning the manually operated switch blade 44 to the normal position. If during the operation of the vehicle a curve is encountered, the turning movement of the steering wheel to direct the vehicle about the curve causes a longitudinal shifting of the block 25 as hereinbefore set forth, with the result that the contact 29 of the block 25 is brought into engagement with one or the other of the resilient contacts 34. Assuming, for example, it is the contact 34 of the binding post 31 which is engaged, current will flow from the source B through wire 49, binding post 37, plate 39, contact 28, connector 30, contact 29, resilient contact 34, binding post 31 and wire 52 to the curve light which is illuminated, thereby illuminating that side of the road toward which the vehicle is turning. At the same time current flows from the plate 39 through the plate 43, contact 38, binding post 36 and wire 50 to the headlights, so that these headlights remain illuminated.

It will be seen that the operation of the curve lights in no manner interferes with the operation of the headlights and that at the same time the number of parts necessary to provide contacts governing the operation of the head and curve lights is reduced to a minimum. It will furthermore be obvious that the construction of the device as hereinbefore set forth is capable of some change and modification without materially departing from the spirit of our invention and we accordingly do not limit ourselves to such specific structure except as hereinafter claimed.

What is claimed is:—

1. The combination with a rotatable member, of a switch element movable parallel with the axis of rotation of said member, operative connections between said rotatable member and said switch element, a pair of electrically connected contacts fixed to said switch element, means placing one of said contacts in continuous connection with one side of a source of electricity, and a pair of separate contacts, each having means to separately place the same in connection with a separate translating device and the other side of said source of electricity, said separate contacts being arranged in the path of movement and at opposite sides of the other contact of the switch element.

2. The combination with a rotatable member, of a switch element movable parallel with the axis of rotation of said member, operative connections between said rotatable member and said swith element, a pair of electrically connected contacts fixed to said switch element, means placing one of said contacts in continuous connection with one side of a source of electricity, and a pair of separate contacts, each having means to separately place the same in connection with a separate translating device and the other side of said source of electricity, said separate contacts being arranged in the path of movement and at opposite sides of the other contact of the switch element, a casing having internal guides for said switch element, and a manually operable switch within the casing including a mounting plate arranged to retain the switch element in said guides, said last named switch further including a movable switch element mounted on said plate and operable to electrically connect said separate contacts.

3. In combination with the hub of a vehicle steering wheel and its steering mast, of a casing mounted on said mast, a member fixed upon the hub of the steering wheel within said casing, a circuit controlling switch element movable parallel with the axis of rotation of the steering wheel and arranged within the casing with one end disposed adjacent said member, and operative connections between said member and said switch element, said member having a pair of spaced peripheral grooves with the ends of the same connected by an obliquely extending groove, and a laterally projecting member fixed upon one end of the switch element and cooperating with the grooves to form said operative connection, a manually operable switch mounted in the casing and including a movable switch element arranged adjacent the first named switch element, a pair of electrically connected contacts fixed to the first named switch element, means to place one of said contacts in constant electrical connection with one side of a source of electricity, a pair of spaced contacts arranged in the path of movement and at opposite sides of the other contact of the first named switch element and each having means to place the same in separate connection with a separate translating device and the other side of said source of electricity, the movable switch element of the manually operable switch being operable to simultaneously electrically connect said separate contacts.

4. In combination with the hub of a vehicle steering wheel and its steering mast, of a casing mounted on said mast, a member fixed upon the hub of the steering wheel within said casing, a circuit controlling switch element movable parallel with the axis of rotation of the steering wheel and arranged within the casing with one end disposed adjacent said member, and operative connections between said member and said switch element, said member having a pair of spaced peripheral grooves with the ends of the same connected by an obliquely extending groove, and a laterally projecting member fixed upon one end of the switch element and cooperating with the grooves to form said operative connection, a manually operable switch mounted in the casing and including a movable switch element arranged adjacent the first named switch element, a pair of electrically connected contacts fixed to the first named switch element, means to place one of said contacts in constant electrical connection with one side of a source of electricity, a pair of spaced contacts arranged in the path of movement and at opposite sides of the other contact of the first named switch element and each having means to place the same in separate connection with a separate translating device and the other side of said source of electricity, the movable switch element of the manually operable switch being operable to simultaneously electrically connect said separate contacts, a mounting plate of insulating material arranged within the casing and carrying the movable element of the manually operable switch and said separate contacts.

In testimony whereof we hereunto affix our signatures.

WILBUR A. LAYCOCK.
JOHN C. FARRAR.
HARRY H. WOLBERT.